United States Patent [19]
Kitakami et al.

[11] Patent Number: 6,070,216
[45] Date of Patent: May 30, 2000

[54] SERIAL I/O MULTICHANNEL SEMICONDUCTOR DEVICE CAPABLE OF SELECTING A TRANSMITTING PIN FOR DATA OUTPUT AND OF DETECTING RECEIVED DATA AT A PLURALITY OF RECEIVING PINS

[75] Inventors: Naoichi Kitakami; Hiroki Takahashi, both of Tokyo, Japan

[73] Assignee: Mitsubishi Denki Kabushiki Kaisha, Tokyo, Japan

[21] Appl. No.: 09/092,071

[22] Filed: Jun. 5, 1998

[30] Foreign Application Priority Data

Jan. 29, 1998 [JP] Japan ................................. 10-017441

[51] Int. Cl.[7] .......................... G06F 13/38; G06F 13/00; G06F 13/14; G06F 3/00; G06F 9/00
[52] U.S. Cl. ............................. 710/129; 710/36; 710/38; 710/100; 710/131; 708/139; 708/168; 709/232; 709/238; 712/225
[58] Field of Search ............................... 710/36, 38, 100, 710/129, 131; 708/139, 131, 168, 160; 709/232, 238; 712/225; 327/18, 40, 71, 82, 90, 333, 603; 365/230.05, 230.08; 364/232.8, 709.01, 709.09, 710.01, 710.08; 395/36, 38, 100, 129, 131, 200.62, 200.68, 566

[56] References Cited

U.S. PATENT DOCUMENTS 4,967,326  10/1990  May ......................................... 364/220
5,701,515  12/1997  Gradeler .................................. 395/834
5,761,463   6/1998  Allen ........................................ 395/309
5,818,426  10/1998  Tierney et al. .......................... 345/161
5,842,032  11/1998  Bertsch .................................... 395/800
5,920,708   7/1999  Gates et al. .............................. 395/309

FOREIGN PATENT DOCUMENTS 9-139757   5/1997  Japan .

*Primary Examiner*—Thomas C. Lee
*Assistant Examiner*—Tanh Nguyen
*Attorney, Agent, or Firm*—Burns, Doane, Swecker & Mathis, LLP

[57] ABSTRACT

A serial I/O incorporated semiconductor device comprises a transmitting unit 4 including a transmission channel selection register 14 for selecting a transmitting pin to output transmit data and a receiving unit 5 including a receiving channel detection circuit 26 for detecting receiving pins that have received data; a receiving channel flag 27 set to have a predetermined value by the receiving channel detection circuit; a plural channels reception detection circuit 28 for detecting that received data is entered to a plurality of receiving pins; and a plural channels receiving flag 29 set to have a predetermined value by the plural channels reception detection circuit 28 detecting received data has been entered to the plurality of receiving pins; wherein when any one of the flags 23, 25, and 29 is set to a predetermined value, the receiving unit supplies the value to a CPU as a reception interrupt signal.

8 Claims, 10 Drawing Sheets

SERIAL I/O MULTICHANNEL SEMICONDUCTOR DEVICE CAPABLE OF SELECTING A TRANSMITTING PIN FOR DATA OUTPUT AND OF DETECTING RECEIVED DATA AT A PLURALITY OF RECEIVING PINS

BACKGROUND OF THE INVENTION

1. Field of the Invention

The present invention relates to a serial I/O incorporated semiconductor device provided with a serial I/O having a plurality of transmitting pins and a plurality of receiving pins.

2. Description of the Prior Art

FIG. 11 is a configuration of a conventional serial I/O incorporated semiconductor device. In FIG. 11, the semiconductor device is provided with only one channel. In FIG. 11, reference numeral 101 indicates an I/O incorporated semiconductor device and 102 indicates a transmitting pin for outputting serial transmit data. 103 indicates a receiving pin for inputting serial received data and 104 indicates a transmitting unit, 105 indicates a receiving unit, 106 indicates a CPU, and 107 indicates a data bus.

In the transmitting unit 104, 111 indicates a transmission shift register for outputting written received data from the transmitting pin 102 and 112 indicates a transmission completion detection circuit for detecting normal completion of transmission of the transmit data 113 indicates a transmission completion flag set to have a predetermined value by the transmission completion detection circuit 112 that has detected normal completion of data transmission.

In the receiving unit 105, 121 indicates a receiving shift register in which received data entered to the receiving pin 103 is written. 122 is a reception completion detection circuit for detecting normal completion of data receiving. 123 indicates a reception completion flag set to have a predetermined value by the reception completion detection circuit 122 that has detected normal completion of data receiving. 124 is a receiving error detection circuit for detecting unusual completion of data receiving. 125 indicates a receiving error flag set to have a predetermined value by the receiving error detection circuit 124 that has detected unusual completion of data receiving. 126 indicates an OR circuit having one input to which the value from the reception completion flag 123 is input and the other input to which the value from the receiving error flag 125 is input respectively. The OR circuit is also provided with an output pin for supplying its value to the CPU 106.

Hereunder, the operation of the I/O incorporated semiconductor device will be explained.

When transmitting transmit data, the transmit data is written in the transmission shift register 111. Then, the transmit data is output from the transmitting pin 102.

When the transmit data is transmitted completely, the transmission completion detection circuit 112 detects the normal completion of the transmission and the transmission completion flag 113 is set to a value "1".

Thereafter, the value of the transmission completion flag 113 is supplied to the CPU 106 as a transmission interruption signal. Receiving the signal, the CPU 106 executes a transmission completion interruption program to check the value of the transmission completion flag 113 and recognizes the normal transmission of the transmit data.

When receiving data, the received data entered to the receiving pin 103 is written in the receiving shift register 121.

When the received data is received normally, the reception completion detection circuit 122 detects the normal completion of reception of the received data and the reception completion flag 123 is set to a value "1". On the other hand, when the received data is not received normally, the receiving error detection circuit 124 detects the unusual completion of receiving and the receiving error flag 125 is set to "1".

The value "1" set in either the reception completion flag 123 or the receiving error flag 125 is supplied to the CPU 106 as a reception interrupt signal. Receiving the signal, the CPU 106 executes a receiving interruption program to check the values of the reception completion flag 123 and the receiving error flag 125. If "1" is set in the reception completion flag 123, the CPU executes a normal processing. If "1" is set in the receiving error flag 125, the CPU executes an error processing.

Because the conventional serial I/O incorporated semiconductor device provided with one channel is constructed described above, the conventional serial I/O incorporated semiconductor, when being provided with a plurality of channels, needed transmitting units and receiving units as many as the number of channels. Consequently, the conventional I/O incorporated semiconductor device provided with a plurality of channels is confronted with a problem that the device becomes very large in size.

SUMMARY OF THE INVENTION

The present invention has been implemented to solve the above-described problem and it is an object to provide a small-sized serial I/O incorporated semiconductor device provided with a plurality of channels.

According to a first aspect of the present invention, the serial I/O incorporated semiconductor device comprises:

a transmitting unit comprising a transmission shift register for outputting written transmit data from the transmitting pins, a transmission completion detection circuit for detecting normal completion of transmission of the transmit data, a transmission completion flag set to have a predetermined value by the transmission completion circuit that has detected normal completion of data transmission, and a transmission channel selection register for selecting the transmitting pin to output transmit data, wherein when the transmission completion flag is set to the predetermined value, the transmitting unit supplies the value to the CPU; and a receiving unit comprising a receiving shift register for writing received data entered to the receiving pins therein, a reception completion detection circuit for detecting normal completion of reception of the received data, a reception completion flag set to have a predetermined value by the reception completion detection circuit that has detected normal completion of data receiving, a receiving error detection circuit for detecting unusual receiving of received data, a receiving error flag set to have a predetermined value by the receiving error detection circuit that has detected unusual receiving of received data, a receiving channel detection circuit for detecting the receiving pins that have received data, a receiving channel flag set to have a predetermined value by the receiving channel detection circuit that has detected the receiving pins that have received data, a plural channels reception detection circuit for detecting that received data is entered to the plurality of receiving pins by searching a value of the receiving channel flag, and a plural channels receiving flag set to have a predetermined value by the plural channels reception detection circuit detecting received data has been entered to the plurality of receiving pins, wherein when any one of the reception completion flag, the receiving error flag, and the plural channels receiving flag is set to the predetermined value, the receiving unit supplies the value to the CPU as a reception interrupt signal.

According to the first aspect of the present invention, because only one transmitting unit is needed for a plurality of transmitting pints and only one receiving unit is needed for a plurality of receiving pins, even a serial I/O incorporated semiconductor provided with a plurality of channels becomes compact in size. There is exhibited an effect that a small sized serial I/O incorporated semiconductor device can be obtained.

According to a second aspect of the present invention, the receiving unit of the serial I/O incorporated semiconductor device includes a receiving channel priority specifying means for specifying priority among the plurality of receiving pins and writing received data entered to the receiving pin having the higher priority in the receiving shift register when the received data is entered to two or more receiving pins concurrently.

According to the second aspect of the present invention, there is exhibited an effect that when data is entered to two or more receiving pins concurrently, the data entered to the higher priority receiving pin can be written in the receiving shift register.

According to a third aspect of the present invention, the receiving unit of the serial I/O incorporated semiconductor device includes a receiving channel priority setting means for setting priority among the plurality of receiving pins and writing received data entered to the receiving pin having the higher priority in the receiving shift register when the received data is entered to two or more receiving pins concurrently.

According to the third aspect of the present invention, there is exhibited an effect that data entered to the higher priority pin set by the receiving channel priority setting means is written in the receiving shift register when data is entered to two or more receiving pins concurrently.

According to a fourth aspect of the present invention, the receiving unit of the serial I/O incorporated semiconductor device includes a receiving channel setting means for writing received data entered to a predetermined receiving pin, the received data being selected from among data entered to the plurality of receiving pins, in the receiving shift register.

According to the fourth aspect of the present invention, there is exhibited an effect that data entered to a receiving pin set by the receiving channel setting means can be written in the receiving shift register.

According to a fifth aspect of the present invention, the receiving unit of the serial I/O incorporated semiconductor includes a receiving inhibiting means for inhibiting writing of received data entered to any of the receiving pins in the receiving shift register after the received data is entered to the plurality of receiving pins concurrently.

According to the fifth aspect of the present invention, it is inhibited to write data entered to any of receiving pins in the receiving shift register after data is entered to two or more receiving pins concurrently. There is exhibited an effect that redundant operations are avoided and accordingly, the power consumption can be reduced significantly.

According to a sixth aspect of the present invention, the receiving unit of the serial I/O incorporated semiconductor includes a simultaneous receiving flag set to have a predetermined value when received data is entered to the plurality of receiving pins concurrently.

According to the sixth aspect of the present invention, there is exhibited an effect that the CPU receives a reception interrupt signal supplied when the simultaneous receiving flag is set to a predetermined value and the CPU can execute a receiving interruption program.

According to a seventh aspect of the present invention, the receiving unit of the serial I/O incorporated semiconductor includes a reception shut-off means for shutting off writing of data entered to other receiving pins in the receiving shift register after a data input is started at any one of the plurality of receiving pins.

According to the seventh aspect of the present invention, it is shut off to write data entered to other receiving pins in the receiving shift register after a data input is started at any one of receiving pins, and accordingly there is exhibited an effect that redundant operations are avoided and accordingly the power consumption can be reduced significantly.

According to an eighth aspect of the present invention, there is provided the serial I/O incorporated semiconductor device, wherein the transmission channel selection register provided in the receiving unit change over the transmitting pin to output transmit data to other pin each time the transmission completion flag is set to the predetermined value.

According to the eighth aspect, there is exhibited a an effect that the transmitting pin for outputting data can be changed over automatically.

DETAILED DESCRIPTION OF THE PREFERRED EMBODIMENTS

Figure 1:
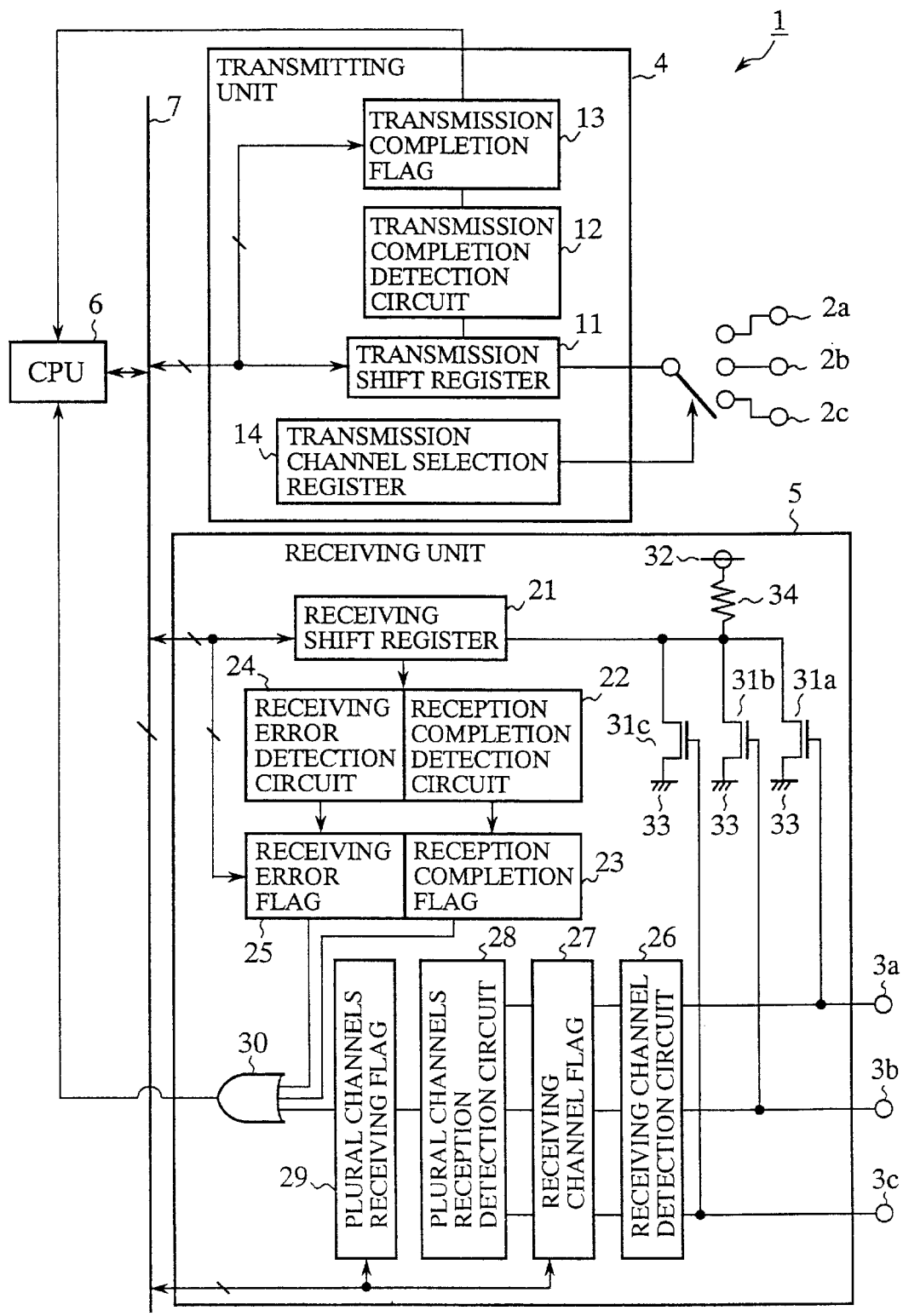
FIG. 1 is a configuration of a serial I/O incorporated semiconductor device in a first embodiment of the present invention.

Hereunder, some embodiments of the present invention will be explained with reference to the attached drawings.
First Embodiment FIG. 1 is a configuration of a serial I/O incorporated semiconductor device in a first embodiment of the present invention. In FIG. 1, the semiconductor device is provided with three channels. In FIG. 1, reference numeral 1 indicates a serial I/O incorporated semiconductor device and 2a to 2c indicate a first to a third transmitting pins (transmitting pin) used to output serial transmit data. 3a to 3c indicate a first to a third receiving pins (receiving pin) used to receive serial received data. 4 indicates a transmitting unit and 5 indicates a receiving unit. 6 indicates a CPU and 7 indicates a data bus.

In the transmitting unit 4, 11 indicates a transmission shift register used to output written transmit data from the first to third transmitting pins 2a to 2c. 12 indicates a transmission completion detection circuit used to detect normal completion of transmission of the transmit data and 13 indicates a transmission completion flag set to have a predetermined value by the transmission completion detection circuit 12 that has detected normal completion of data transmission. 14 indicates a transmission channel selection register used to select the transmitting pin for outputting the transmit data.

In the receiving unit 5, 21 indicates a receiving shift register in which received data entered to the first to third receiving pins 3a to 3c is written. 22 indicates a reception completion detection circuit used to detect normal completion of reception of the received data and 23 indicates a reception completion flag set to have a predetermined value by the reception completion detection circuit 22 that has detected normal completion of data receiving. 24 indicates a receiving error detection circuit used to detect unusual completion of reception of the received data and 25 indicates a receiving error flag set to have a predetermined value by the receiving error detection circuit 24 that has detected unusual completion of data receiving. 26 indicates a receiving channel detection circuit used to detect the receiving pin that has received data and 27 indicates a receiving channel flag set to have a predetermined value by the receiving channel detection circuit 26 that has detected the receiving pin that has received data and 28 indicates a plural channels reception detection circuit used to check the value of the receiving channel flag 27 to detect that received data has been entered to the plurality of receiving pins. 29 indicates a plural channels receiving flag set to have a predetermined value by the plural channels reception detection circuit 28 that has detected that data has been entered to the plurality of receiving pins and 30 indicates a first OR circuit provided with the first input to receive the value from the reception completion flag 23, the second input to receive the value from the receiving error flag 25, and the third input to receive the value from the plural channels receiving flag 29. The first OR circuit 30 outputs signals to the CPU 6. 31a indicates a first NMOS transistor having a gate connected to the first receiving pin 3a and a drain connected to the receiving shift register 21. 31b indicates a second NMOS transistor having a gate connected to the second receiving pin 3b and a drain connected to the receiving shift register 21. 31c indicates a third NMOS transistor having a gate connected to the third receiving pin 3c and a drain connected to the receiving shift register 21. 32 indicates a power supply and 33 indicates a ground. 34 indicates a first resistor having one end connected to the power supply and the other end connected to the first to third NMOS transistors 31 to 31c.

Next, the operation of the serial I/O incorporated semiconductor device in the first embodiment of the present invention will be explained.

When transmitting transmit data, a transmitting pin is selected by the transmission channel selection register 14 before the transmit data is transmitted. Thereafter, the transmit data is written in the transmission shift register 11. The written transmit data is then output from the transmitting pin selected by the transmission channel selection register 14.

When the transmit data is transmitted normally, it is detected by the transmission completion detection circuit 12 and the transmission completion flag is set to "1" (H level).

The value "1" set in the transmission completion flag is supplied to the CPU 6 as a transmission interruption signal. Receiving the signal, the CPU 6 executes a transmission interruption program to check the value of the transmission completion flag 13 and recognizes that the transmit data has been transmitted normally.

When receiving received data, the received data entered to the first to third receiving pins 3a to 3c is written in the receiving shift register 21. Then, the data received pin is detected by the receiving channel detection circuit 26 and the receiving channel flag 27 corresponding to the data received pin is set to "1" (H level).

When the received data is received normally, it is detected by the reception completion detection circuit 22 and the reception completion flag 23 is set to "1" (H level). On the other hand, when received data is not received normally, it is detected by the receiving error detection circuit 24 and the receiving error flag 25 is set to "1" (H level). If, while the received data is entered to any one of the first to third receiving pins 3a to 3c, received data is entered to another receiving pin, then the plural channels reception detection circuit 28 detects it that the received data has been entered to the plurality of receiving pins, and the plural channels receiving flag 29 is set to "1" (H level).

When "1" is set in any one of the reception completion flag 23, the receiving error flag 25, and the plural channels receiving flag 29, the value is supplied to the CPU 6 as a reception interrupt signal. Receiving the signal, the CPU 6 executes a receiving interruption program to check the values of the reception completion flag 23, the receiving error flag 25, and the plural channels receiving flag 29. If "1" is set in the reception completion flag 23, the CPU 6 executes a normal processing. If "1" is set in the receiving error flag 25, the CPU 6 executes an error processing. If "1" is set in the plural channels receiving flag 29, the CPU 6, recognizing that data has not been received normally, checks the value of the receiving channel flag 27. Then, the CPU 6 transmits the data of notifying unusual termination of data receiving in the above procedure to the data sender corresponding to the data received pin.

Figure 2:
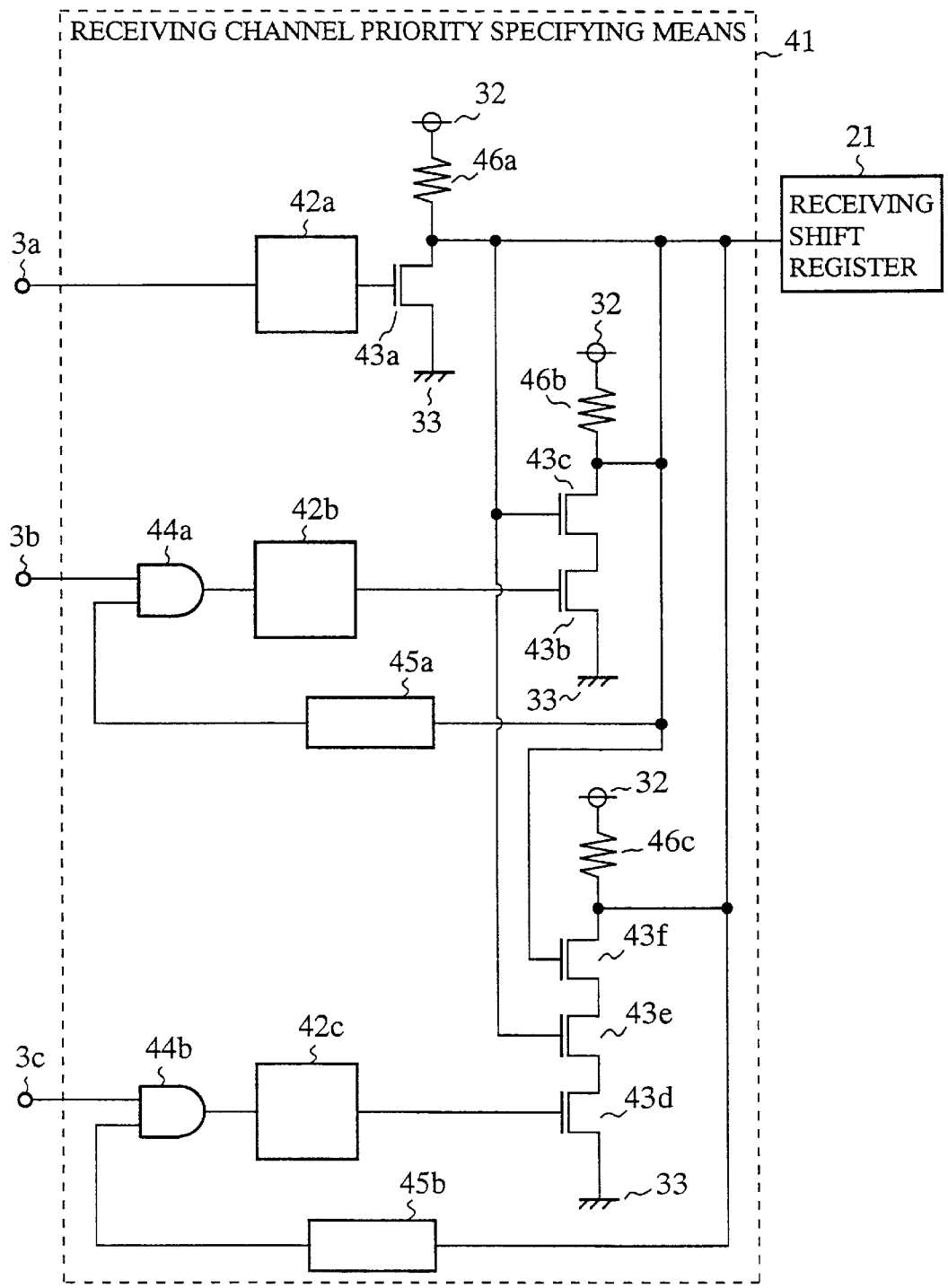
FIG. 2 is a configuration of a receiving channel priority specifying means provided in a receiving unit of the serial I/O incorporated semiconductor device in a second embodiment of the present invention.

As explained above, according to this first embodiment, because only one transmitting unit is needed for a plurality of transmitting pins and only one receiving unit is needed for a plurality of receiving pins, it is possible to reduce even the size of the serial I/O incorporated semiconductor device provided with a plurality of channels, thereby obtaining a small sized serial I/O incorporated semiconductor device provided with a plurality of channels.
Second Embodiment FIG. 2 is a configuration of a receiving channel priority specifying means provided in the receiving unit of the serial I/O incorporated semiconductor device in a second embodiment of the present invention. In FIG. 2, the semiconductor device is provided with 3 channels. In FIG. 2, 41 indicates the receiving channel priority specifying means for specifying the priority in the order of a first receiving pin 3a, a second receiving pin 3b, and a third receiving pin 3c and writing received data entered to the receiving pin having the higher priority in the receiving shift register 21 when data is entered to two or more receiving pins concurrently. The specifying means 41 is provided between the first to third receiving pins 3a to 3c, and the receiving shift register 21.

In the receiving channel priority specifying means 41, 42a indicates a first start bit detection circuit having an input is connected to the first receiving pin 3a, 43a indicates a fourth NMOS transistor having a gate connected to the output of the first start bit detection circuit 42a and a drain to connected the receiving shift register 21. 46a indicates a second resistor having one end connected to the power supply 32 and the other end connected to the drain of the fourth NMOS transistor 43a.

44a indicates a first AND circuit having one input connected to the second receiving pin 3b. 42b indicates a second start bit detection circuit having an input connected to the output of the first AND circuit 44a. 43b indicates a fifth NMOS transistor having a gate connected to the output of the second start bit detection circuit 42b. 43c indicates a sixth NMOS transistor having a gate connected to the drain of the fourth NMOS transistor 43a, an output connected to the drain of the fifth NMOS transistor 43b, and a drain connected to the receiving shift register 21. 45a indicates a first flip-flop circuit having an input connected to the drain of the fourth NMOS transistor 43a and having the Q output connected to the other input of the first AND circuit 44a. 46b indicates a third resistor having one end connected to the power supply 32 and the other end connected to the drain of the sixth NMOS transistor 43c.

44b indicates a second AND circuit having one input connected to the third receiving pin 3c. 42c indicates a third start bit detection circuit having an input connected to the output of the second AND circuit 44b and 43d indicates a seventh NMOS transistor having a gate connected to the output of the third start bit detection circuit 42c. 43e indicates an eighth NMOS transistor having a gate connected to the drain of the fourth NMOS transistor 43a and a source connected to the drain of the seventh NMOS transistor 43d. 43f indicates a ninth NMOS transistor having a gate connected to the drain of the sixth NMOS transistor 43c, a source connected to the drain of the eighth NMOS transistor 43e, and a drain connected to the receiving shift register 21 respectively. 45b indicates a second flip-flop circuit having an input connected to the drains of the fourth and ninth NMOS transistors 43a and 43f and having the Q output connected to the other input of the second AND circuit 44b. 46c indicates a fourth resistor having one end connected to the power supply 32 and the other end connected to the drain of the ninth NMOS transistor 43f.

Other elements are the same as or equal to those given the same numerals in FIG. 1.

Received data comprises a start bit positioned at a leading end and kept at the L level for a fixed period and data positioned a predetermined interval after the start bit, so the receiving channel priority setting means 41 recognizes that the first to third start bit detection circuits 42a to 42c are set at the L level for a fixed period to detect each start bit. Especially, unless otherwise explained, this should also be true for the start bit detection circuits to be explained in the subsequent embodiments.

Figure 3:
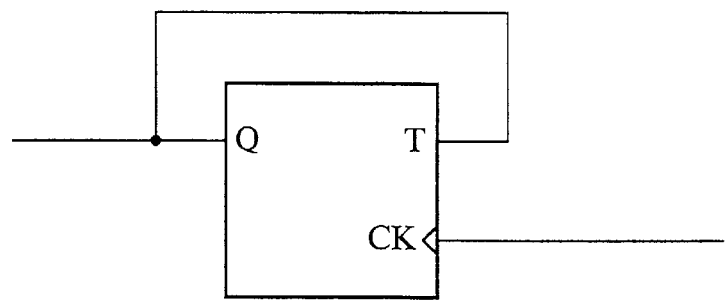
FIG. 3 is a configuration of a flip-flop circuit.

Furthermore, as shown in FIG. 3, it is premised in this embodiment that the first flip-flop circuit 45a is allowed to have the clock input connected to the drain of the fourth NMOS transistor 43a and to have the Q output connected to the T input and the other input of the first AND circuit 44a in the receiving channel priority specifying means 41 and thereby the Q output is at the H level in the initial status. And, the second flip-flop circuit 45b is allowed to have the clock input connected to the drains of the fourth and ninth NMOS transistors 43a and 43f and to have the Q output connected to the T input and the other input of the second AND circuit 44b. In the initial status, it is premised that the Q output is at the H level. Especially, unless otherwise explained, this is also true for the flip-flop circuits in the subsequent embodiments.

Next, the operation will be explained.

When received data is entered to the first receiving pin 3a, the start bit of the received data is detected by the first start bit detection circuit 42a. Immediately after the detection, the output of the first start bit detection circuit 42a enters the H level. Then, the fourth NMOS transistor 43a is turned on, so that the drain of the fourth NMOS transistor 43a enters the L level. Thereafter, the Q outputs of the first and second flip-flop circuits 45a and 45b enter the L level, and subsequently, the Q outputs of the first and second flip-flop circuits 45a and 45b are kept at the L level until they are returned to the initial state.

When the received data is entered to the first receiving pin 3a, the Q outputs of the first and second flip-flop circuits 45a and 45b enter the L level. Consequently, the other inputs of the first and second AND circuits 44a and 44b enter the L level respectively. Thereafter, even if received data is entered to the second and third receiving pins 3b and 3c, the outputs of the first and second AND circuits 44a and 44b are kept at the L level and the received data entered to the second and third receiving pins 3b and 3c cannot be written in the receiving shift register 21 and the received data entered to the first receiving pin 3a is written in the receiving shift register 21.

In addition, if received data is entered to the first to third receiving pins 3a to 3c concurrently, the start bits of the received data entered to the first to third receiving pins 3a to 3c are detected by the first to third start bit detection circuits 42a to 42c respectively. Immediately after the detection, the outputs of the first to third start bit detection circuits 42a to 42c enter the H level respectively.

When the received data is entered to the first to third receiving pins 3a to 3c concurrently, the outputs of the first to third start bit detection circuits 42a to 42c enter the H level immediately after the detection. When the output of the first start bit detection circuit 42a enters the H level, however, the fourth NMOS transistor 43a is turned on, so that the drain of the fourth NMOS transistor 43a enters the L level. Thus, the sixth and ninth NMOS transistors 43c and 43f are turned off. Consequently, even if the received data is entered to the first to third receiving pins 3a to 3c, the sixth and ninth NMOS transistors 43c and 43f are turned off and the received data entered to the second and third receiving pins 3b and 3c cannot be written in the receiving shift register 21. Thus, only the received data entered to the first receiving pin 3a is written in the receiving shift register 21.

As explained above, according to this second embodiment, because the receiving channel priority specifying means is provided in the receiving unit, it is possible to obtain an effect that received data entered to the receiving pin having the higher priority can be written in the receiving shift register when the received data is entered to two or more receiving pins concurrently.

Third Embodiment

Figure 4:
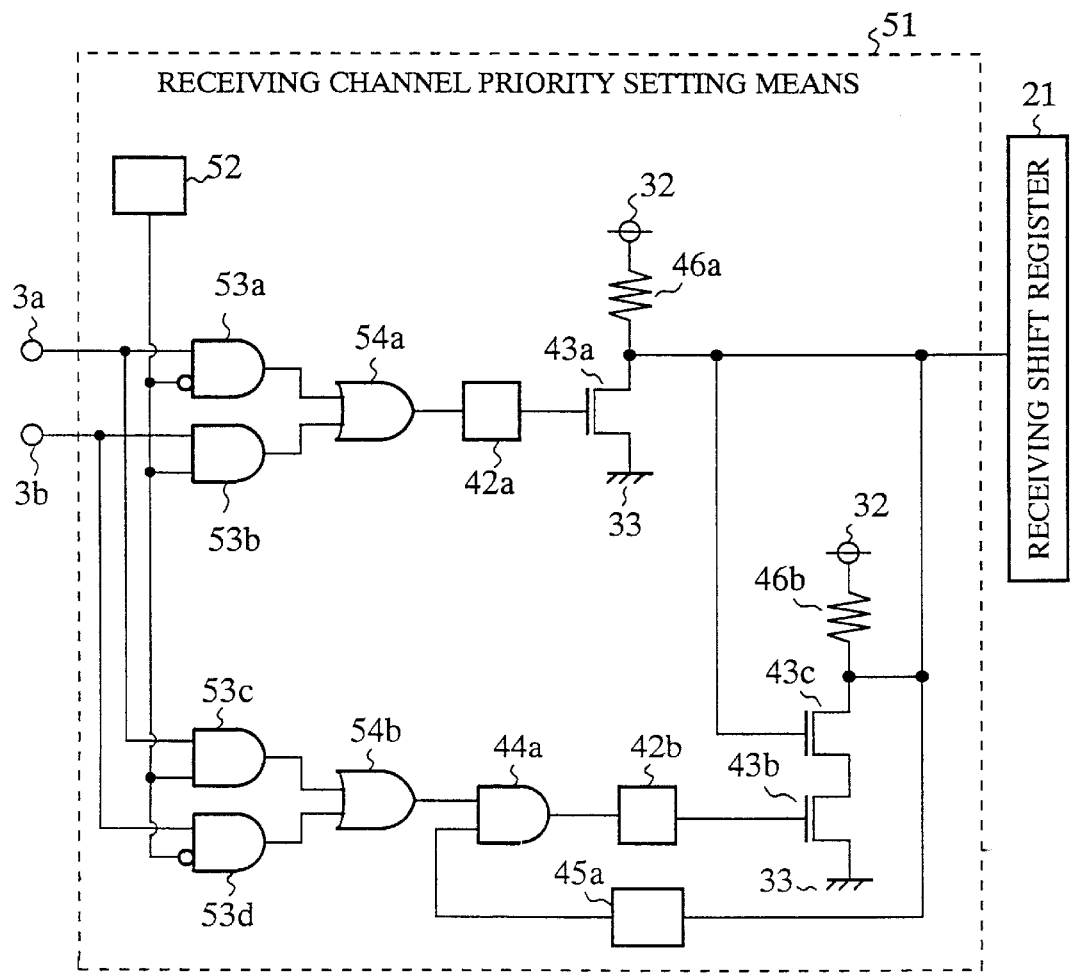
FIG. 4 is a configuration of a receiving channel priority setting means provided in the receiving unit of the serial I/O incorporated semiconductor device in a third embodiment of the present invention.

FIG. 4 is a configuration of a receiving channel priority setting means provided in the receiving unit of the serial I/O incorporated semiconductor device in a third embodiment of the present invention. In FIG. 4, the semiconductor device is provided with two channels. In FIG. 4, 51 indicates the receiving channel priority setting means for setting the predetermined priority with respect to the first and second receiving pins 3a and 3b to write received data having the higher priority in the receiving shift register 21 when received data is entered to two receiving pins concurrently. The means 51 is provided between the first and second receiving pins 3a and 3b, and the receiving shift register 21.

In the receiving channel priority setting means 51, 52 indicates a priority channel setting register provided with a storage for storing single bit information.

53a indicates a third AND circuit having one input connected to the first receiving pin 3a and having the other input connected to the priority channel setting register 52 so as to receive a reversed value from the priority channel setting register 52. 53b indicates a fourth AND circuit having one input connected to the second receiving pin 3b and having the other input connected to the priority channel setting register 52. 54a indicates a second OR circuit having one input connected to the output of the third AND circuit 53a and having the other input connected to the output of the fourth AND circuit 53b.

In addition, 53c indicates a fifth AND circuit having one input connected to the first receiving pin 3a and having the other input connected to the priority channel setting register 52. 53d indicates a sixth AND circuit having one input connected to the second receiving pin 3b and having the other input connected to the priority channel setting register 52 so as to receive a reversed value from the register 52. 54b indicates a third OR circuit having one input connected to the output of the fifth AND circuit 53c and having the other input connected to the output of the sixth AND circuit 53d.

Other elements are the same as or equal to those given the same numerals in FIG. 2.

Next, the operation will be explained.

When "0" is set in the priority channel setting register 52, the start bit of the received data entered to the first receiving pin 3a is detected by the first start bit detection circuit 42a and the start bit of the received data entered to the second receiving pin 3b is detected by the second start bit detection circuit 42b.

Consequently, when "0" is set in the priority channel setting register 52, priority is given in the order of the first receiving pin 3a and the second receiving pin 3b.

When "1" is set in the priority channel setting register 52, the start bit of the received data entered to the first receiving pin 3a is detected by the second start bit detection circuit 42b and the start bit of the received data entered to the second receiving pin 3b is detected by the first start bit detection circuit 42a.

Consequently, when "1" is set in the priority channel setting register 52, priority is given in the order of the second receiving pin 3b and the first receiving pin 3a.

Figure 5:
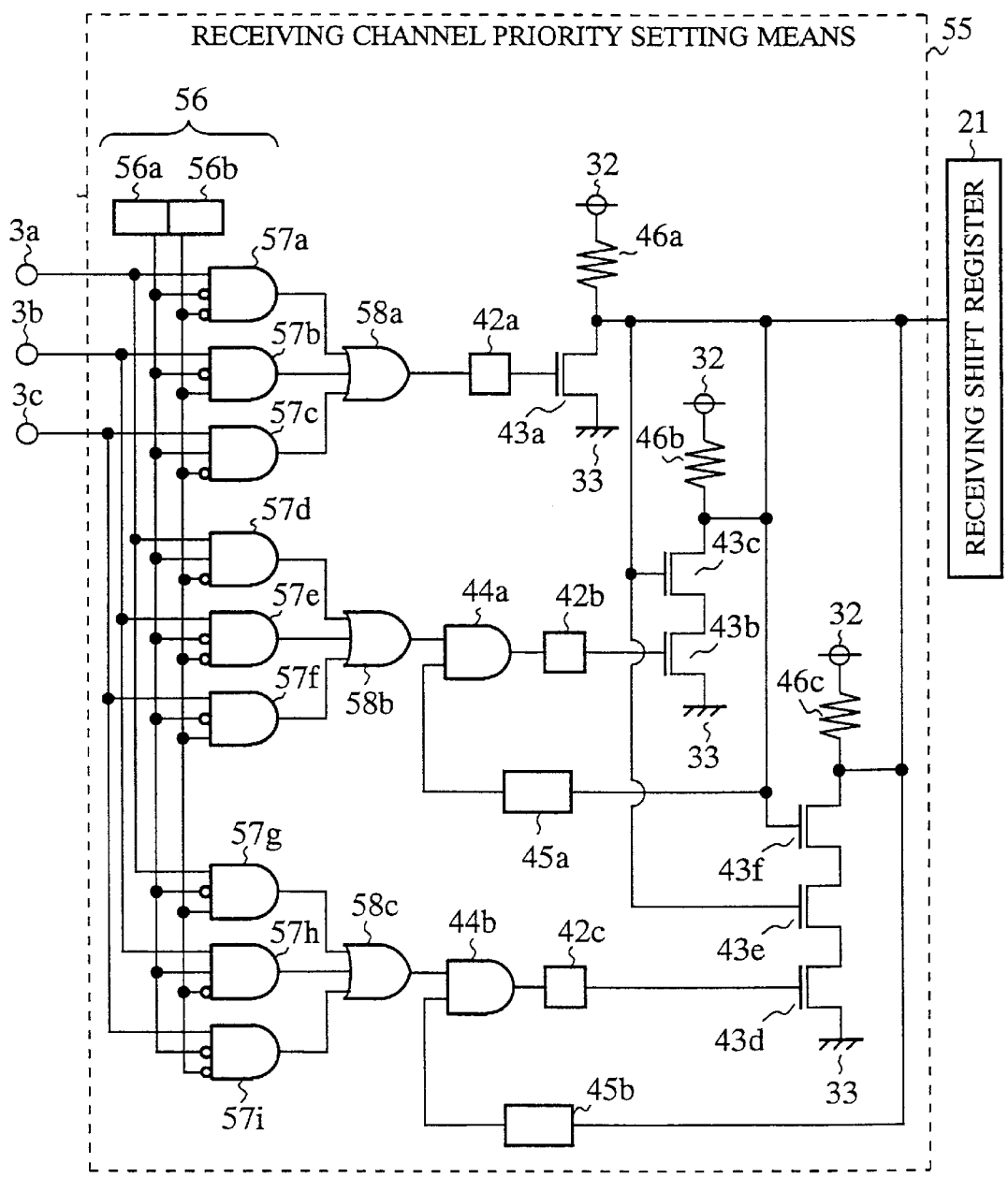
FIG. 5 is a configuration of another receiving channel priority setting means provided in the receiving unit of the serial I/O incorporated semiconductor device in the third embodiment of the present invention.

FIG. 5 is a configuration of another receiving channel priority setting means provided in the receiving unit of the serial I/O incorporated semiconductor device in the third embodiment of the present invention. In FIG. 5, the semiconductor device is provided with 3 channels. In FIG. 5, 55 indicates the receiving channel priority setting means for setting a predetermined priority given to the first to third receiving pins 3a to 3c so that received data entered to the receiving pin having the higher priority is written in the receiving shift register 21 when the received data is entered to two receiving pins concurrently. The priority setting means 55 is provided between the first to third receiving pins 3a to 3c, and the receiving shift register 21.

In the receiving channel priority setting means 55, 56 indicates a priority channel setting register provided with the first and second storages 56a and 56b used to store single bit information.

57a indicates a seventh AND circuit having a first input connected to the first receiving pin 3a, a second input connected to the first storage 56a of the priority channel setting register 56 so as to receive a reversed value from the first storage 56, and a third input connected to the second storage 56b of the priority channel setting register 56 so as to receive a reversed value from the second storage 56b. 57b indicates an eighth AND circuit having a first input connected to the second receiving pin 3b, a second input connected to the first storage 56a of the priority channel setting register 56 so as to receive a reversed value from the first storage 56a, and a third input connected to the second storage 56b of the priority channel setting register 56. 57c indicates a ninth AND circuit having a first input connected to the third receiving pin 3c, a second input connected to the first storage 56a of the priority channel setting register 56, and a third input connected to the second storage 56b of the priority channel setting register 56 so as to receive a reversed value from the second storage 56b. 58a indicates a fourth OR circuit having a first input connected to the output of the seventh AND circuit 57a, a second input connected to the output of the eighth AND circuit 57b, and a third input connected to the output of the ninth AND circuit 57c respectively.

57d indicates a tenth AND circuit having a first input connected to the first receiving pin 3a, a second input connected to the first storage 56a of the priority channel setting register 56, and a third input connected to the second storage 56b of the priority channel setting register 56 so as to receive a reversed value from the second storage 56b. 57e indicates an eleventh AND circuit having a first input connected to the second receiving pin 3b, a second input connected to the first storage 56a of the priority channel setting register 56 so as to receive a reversed value from the first storage 56, and a third input connected to the second storage 56b of the priority channel setting register 56 so as to receive a reversed value from the second storage 56b. 57f indicates a twelfth AND circuit having a first input connected to the third receiving pin 3c, a second input connected to the first storage 56a of the priority channel setting register 56 so as to receive a reversed value from the first storage 56, and a third input connected to the second storage 56b of the priority channel setting register 56. 58b indicates a fifth OR circuit having a first input connected to the output of the tenth AND circuit 57d, a second input connected to the output of the eleventh AND circuit 57e, and a third input connected to the output of the twelfth AND circuit 57f respectively. 57g indicates a thirteenth AND circuit having a first input connected to the first receiving pin 3a, a second input connected to the first storage 56a of the priority channel setting register 56 so as to receive a reversed value from the first storage 56, and a third input connected to the second storage 56b of the priority channel setting register 56. 57h indicates a fourteenth AND circuit having a first input connected to the second receiving pin 3b, a second input connected to the first storage 56a of the priority channel setting register 56, and a third input connected to the second storage 56b of the priority channel setting register 56 so as to receive a reversed value from the second storage 56b. 57i indicates a fifteenth AND circuit having a first input connected to the third receiving pin 3c, a second input connected to the first storage 56a of the priority channel setting register 56 so as to receive a reversed value from the first storage 56, and a third input connected to the second storage 56b of the priority channel setting register 56 so as to receive a reversed value from the second storage 56b. 58c indicates a sixth OR circuit having a first input connected to the output of the thirteenth AND circuit 57g, a second input connected to the output of the fourteenth AND circuit 57h, and a third input connected to the output of the fifteenth AND circuit 57i respectively.

Other elements are the same as or equal to those given the same numerals in FIG. 2.

Next, the operation will be explained.

When "0" is set both in the first storage 56a and a in the second storage 56b, the start bit of the data entered to the first receiving pin 3a is detected by the first start bit detection circuit 42a, the start bit of the data entered to the second receiving pin 3b is detected by the second start bit detection circuit 42b, and the start bit of the data entered to the third receiving pin 3c is detected by the third start bit detection circuit 42c respectively.

Consequently, when "0" is set both in the first storage 56a and in the second storage 56b, priority is given in the order of the first receiving pin 3a, the second receiving pin 3b, and the third receiving pin 3c.

When "0" is set in the first storage 56a and "1" is set in the second storage 56b, the start bit of the data entered to the first receiving pin 3a is detected by the third start bit detection circuit 42c, the start bit of the data entered to the second receiving pin 3b is detected by the first start bit detection circuit 42a, and the start bit of the data entered to the third receiving pin 3c is detected by the second start bit detection circuit 42b respectively.

Consequently, when "0" is set in the first storage 56a and "1" is set in the second storage 56b, priority is given in the order of the second receiving pin 3b, the third receiving pin 3c, and the first receiving pin 3a.

When "1" is set in the first storage 56a and "0" is set in the second storage 56b, the start bit of the data entered to the first receiving pin 3a is detected by the second start bit detection circuit 42b, the start bit of the data entered to the second receiving pin 3b is detected by the third start bit detection circuit 42c, and the start bit of the data entered to the third receiving pin 3c is detected by the first start bit detection circuit 42a respectively.

Consequently, when "1" is set in the first storage 56a and "0" is set in the second storage 56b, priority is given in the order of the third receiving pin 3c, the first receiving pin 3a, and the second receiving pin 3b.

As explained above, according to the above third embodiment, because the receiving channel priority setting means is provided in the receiving unit, it is possible to obtain an effect that data entered to the receiving pin with the higher priority set by the receiving channel priority setting means is written in the receiving shift register when data is entered to two or more receiving pins concurrently.

Fourth Embodiment

Figure 6:
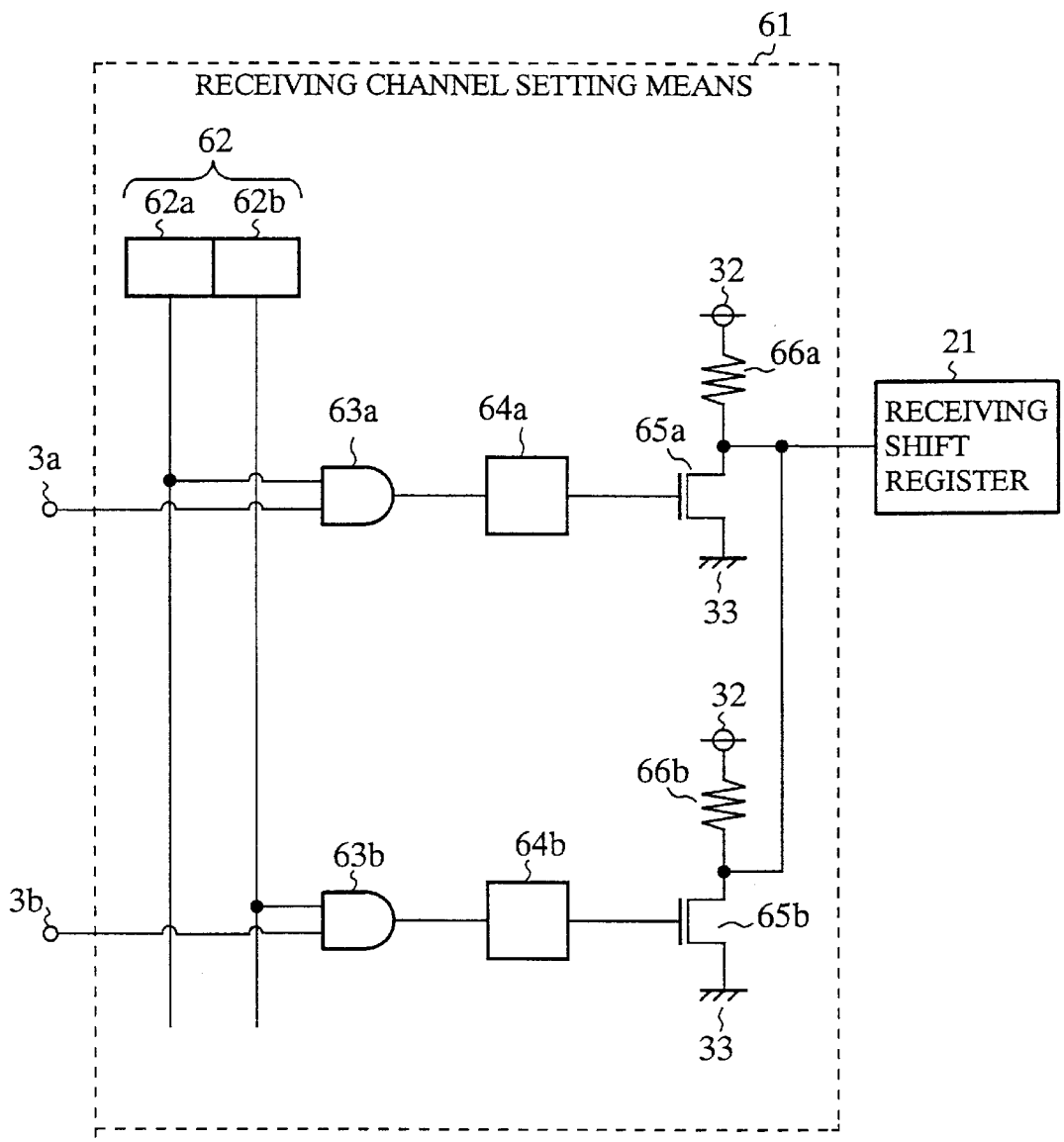
FIG. 6 is a configuration of a receiving channel setting means provided in the receiving unit of the serial I/O incorporated semiconductor device in a fourth embodiment of the present invention.

FIG. 6 is a configuration of a receiving channel setting means provided in the receiving unit of the serial I/O incorporated semiconductor device in a fourth embodiment of the present invention. In FIG. 6, the semiconductor device is provided with two channels. In FIG. 6, 61 indicates the receiving channel setting means for writing received data entered to a predetermined receiving pin, selected from the data entered to the first and second receiving pins 3a and 3b, in the receiving shift register 21. The channel setting means 61 is provided between the first and second receiving pins 3a and 3b, and the receiving shift register 21.

In the receiving channel setting means 61, 62 indicates a receiving channel setting register provided with first and second storages 62a and 62b. 63a indicates a sixteenth AND circuit having one input connected to the first storage 62a of the receiving channel setting register 62 and having the other input connected to the first receiving pin 3a. 64a indicates a fourth start bit detection circuit having an input connected to the output of the sixteenth AND circuit and 65a indicates a tenth NMOS transistor having a gate connected to the output of the fourth start bit detection circuit 64a and a drain connected to the receiving shift register 21. 66a indicates a fifth resistor having one end connected to the power supply 32 and the other end connected to the tenth NMOS transistor 65a.

63b indicates a seventeenth AND circuit having one input connected to the second storage 62b of the receiving channel setting register 62 and having the other input connected to the second receiving pin 3b. 64b indicates a fifth start bit detection circuit having an input connected to the output of the seventeenth AND circuit 63b. 65b indicates an eleventh NMOS transistor having a gate connected to the output of the fifth start bit detection circuit 64b and a drain connected to the receiving shift register 21. 66b indicates a sixth resistor having one end connected to the power supply 32 and the other end connected to the eleventh NMOS transistor 65b.

Other elements are the same as or equal to those given the same numerals in FIG. 1.

Next, the operation will be explained.

When "1" is set in the first storage 62a and "0" is set in the second storage 62b, the sixteenth AND circuit 63a enters the H level at one input thereof and the seventeenth AND circuit 63b enters the L level at one input thereof.

Consequently, when "1" is set in the first storage 62a and "0" is set in the second storage 62b, the sixteenth AND circuit 63a enters the H level at one input thereof, so the output level of the sixteenth AND circuit 63a is changed according to the received data entered to the first receiving pin 3a and the seventeenth AND circuit 63b enters the L level at one input thereof, so the output of the seventeenth AND is kept at the L level even if received data is entered to the second receiving pin 3b. Thus, the received data entered to the first receiving pin 3a is written in the receiving shift register 21.

When "0" is set in the first storage 62a and "1" is set in the second storage 62b, the sixteenth AND circuit 63a enters the L level at one input thereof and the seventeenth AND circuit 63b enters the H level at one input thereof.

Consequently, when "0" is set in the first storage 62a and "1" is set in the second storage 62b, the sixteenth AND circuit 63a enters the L level at one input thereof, so the output of the sixteenth AND circuit 63a is kept at the L level even if received data is entered to the first receiving pin 3a. On the other hand, because the seventeenth AND circuit 63b enters the R level one input thereof, the output level of the seventeenth AND circuit is changed according to received data entered to the second receiving pin 3b. Thus, the received data entered to the second receiving pin 3b is written in the receiving shift register 21.

As explained above, according to the above fourth embodiment, because the receiving channel setting means is provided in the receiving unit, it is possible to obtain an effect that the received data entered to the receiving pin set by the receiving channel setting means can be written in the receiving shift register.

Fifth Embodiment

Figure 7:
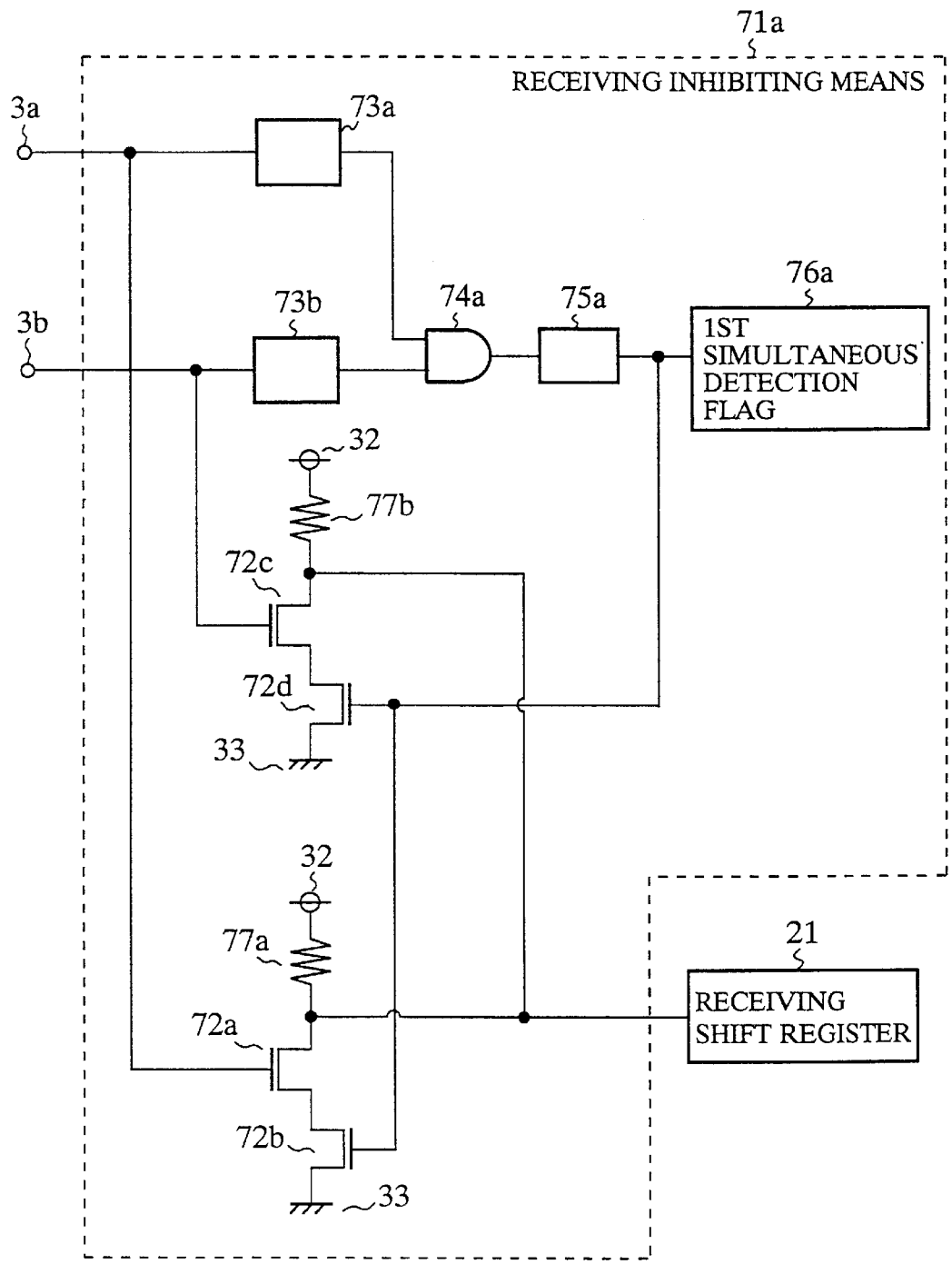
FIG. 7 is a configuration of a receiving inhibiting means provided in the receiving unit of the serial I/O incorporated semiconductor device in a fifth embodiment of the present invention.

FIG. 7 is a configuration of a receiving inhibiting means provided in the receiving unit of the serial I/O incorporated semiconductor device in a fifth embodiment of the present invention. In FIG. 7, the semiconductor device is provided with two channels. In FIG. 7, 71a indicates the receiving inhibiting means for inhibiting writing of received data entered to the first and second receiving pins 3a and 3b in the receiving shift register 21 after the received data is entered to the first and second receiving pins 3a and 3b concurrently. The inhibiting means 71a is provided between the first and second receiving pins 3a and 3b, and the receiving shift register 21.

In the receiving inhibiting means 71a, 72a indicates a twelfth NMOS transistor having a gate connected to the first receiving pin 3a and a drain connected to the receiving shift register 21. 72b indicates a thirteenth NMOS transistor having a drain connected to the source of the twelfth NMOS transistor 72a. 73a indicates a sixth start bit detection circuit having an input connected to the first receiving pin 3a. 77a indicates a seventh resistor having one end connected to the power supply 32 and the other end connected to the drain of the twelfth NMOS transistor 72a.

72c indicates a fourteenth NMOS transistor having a gate connected to the second receiving pin 3b and a drain connected to the receiving shift register 21. 72d indicates a fifteenth NMOS transistor having a drain connected to the source of the fourteenth NMOS transistor 72c. 73b indicates a seventh start bit detection circuit having an input connected to the second receiving pin 3b. 77b indicates an eighth resistor having one end connected to the power supply 32 and the other end connected to the drain of the fourteenth NMOS transistor 72c.

74a indicates an eighteenth AND circuit having one input connected to the output of the sixth start bit detection circuit 73a and having the other input connected to the output of the seventh start bit detection circuit 73b. 75a indicates a third flip-flop circuit having an input connected to the output of the eighteenth AND circuit 74a and the Q output connected to the gate of the thirteenth and fifteenth NMOS transistors 72b and 72d respectively. 76a indicates a first simultaneous detection flag set to a predetermined value when the Q output of the third flip-flop circuit 75a enters the L level.

Other elements are the same as or equal to those given the same numerals in FIG. 1.

Next, the operation will be explained.

When received data is entered to the first and second receiving pins 3a and 3b concurrently, the start bits of the data entered to the first and second receiving pins 3a and 3b are detected by the sixth and seventh start bit detection circuits 73a and 73b. Immediately after the detection, the outputs of the sixth and seventh start bit detection circuits 73a and 73b enter the H level concurrently. Then, the output of the eighteenth AND circuit 74a enters the H level. When the level of the output of the eighteenth AND circuit 74a is changed from L to H, the Q output of the third flip-flop circuit 75a enters the L level, and thereafter, the Q output of the third flip-flop circuit 75a is kept at the L level until the circuit 75a itself is returned to the initial state. When the Q output of the third flip-flop circuit 75a enters the L level, the first simultaneous detection flag 76a is set to "1".

When received data is entered to the first and second receiving pins 3a and 3b concurrently, the third flip-flop circuit 75a enters the L level. Thus, the thirteenth and fifteenth NMOS transistors 72b and 72d are turned off. As a result, thereafter, even if the received data is entered to the first and second receiving pins 3a and 3b, the drains of the thirteenth and fifteenth NMOS transistors 72b and 72d are kept at the H level and the received data entered to the first and second receiving pins 3a and 3b cannot be written in the receiving shift register 21.

When received data is entered to the first and second receiving pins 3a and 3b concurrently, the first simultaneous detection flag 76a is set to "1" and the value is supplied to the CPU as a reception interrupt signal. Upon receiving the interruption signal, the CPU executes a receiving interruption program.

Figure 8:
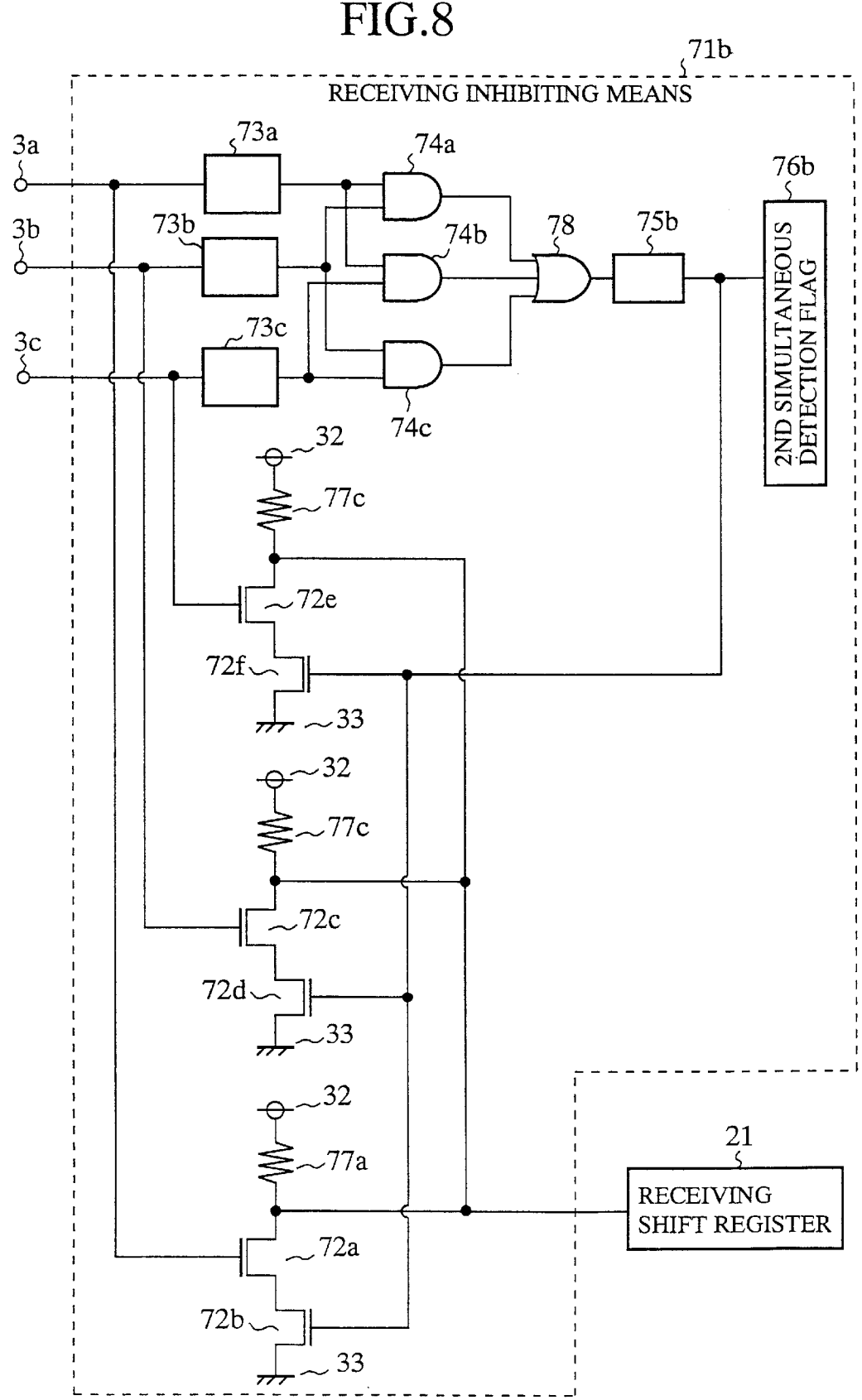
FIG. 8 is a configuration of another receiving inhibiting means provided in the receiving unit of the serial I/O incorporated semiconductor device in the fifth embodiment of the present invention.

FIG. 8 is a configuration of another receiving inhibiting means provided in the receiving unit of the serial I/O incorporated semiconductor device in the fifth embodiment of the present invention. In FIG. 8, the semiconductor device is provided with three channels. In FIG. 8, 71b indicates the receiving inhibiting means for inhibiting writing of received data entered to the first to third receiving pins 3a to 3c in the receiving shift register 21 after the received data is entered to at least two receiving pins of the first to third receiving pins 3a to 3c concurrently. The inhibiting means 71b is provided between the first to third receiving pins 3a to 3c, and the receiving shift register 21.

In the receiving inhibiting means 71b, 72e indicates a sixteenth NMOS transistor having a gate connected to the third receiving pin 3c and a drain connected to the receiving shift register 21. 72f indicates a seventeenth NMOS transistor having a drain connected to the source of the sixteenth NMOS transistor 72e. 73c indicates an eighth start bit detection circuit having an input connected to the third receiving pin 3c. 77c indicates a ninth resistor having one end connected to the power supply 32 and the other end connected to the drain of the sixteenth NMOS transistor 72c.

74b indicates a nineteenth AND circuit having one input connected to the output of the sixth start bit detection circuit 73a and having the other input connected to the output of the eighth start bit detection circuit 73c. 74c indicates a twentieth AND circuit having one input connected to the output of the seventh start bit detection circuit 73b and having the other input connected to the output of the eighth start bit detection circuit 73c. 78 indicates a seventh OR circuit having a first input connected to the output of the eighteenth AND circuit 74a, a second input connected to the output of the nineteenth AND circuit 74b, and a third input connected to the output of the twentieth AND circuit 74c respectively. 75b indicates a fourth flip-flop circuit having an input connected to the output of the seventh OR circuit 78 and the Q output connected to the gates of the thirteenth, fifteenth, and seventeenth NMOS transistors 72b, 72d, and 72f respectively. 76b indicates a second simultaneous receiving flag set to a predetermined value when the Q output of the fourth flip-flop circuit 75b enters the L level.

Other elements are the same as or equal to those given the same numerals in FIG. 7.

Next, the operation will be explained.

When received data is entered to at least two of the first to third receiving pins 3a to 3c concurrently, the start bits of the received data entered to at least two of the first to third receiving pins 3a to 3c are detected by at least two of the sixth to eighth start bit detection circuits 73a to 73c. Immediately after the detection, the outputs of at least two of the sixth to eighth start bit detection circuits 73a to 73c enter the H level concurrently. Then, the output of at least one of the eighteenth to twentieth AND circuits 74a to 74c enters the H level. When the output level of at least one of the eighteenth to twentieth AND circuits 74a to 74c is changed from L to H, the Q output of the fourth flip-flop circuit 75b enters the L level, and thereafter, the Q output of the fourth flip-flop circuit 75b is kept at the L level until the circuit 75b itself is returned to the initial state. When the Q output of the fourth flip-flop circuit 75b enters the L level, the second simultaneous detection flag 76b is set to "1".

When received data is entered to at least two of the first to third receiving pins 3a to 3c concurrently, the fourth flip-flop circuit 75b enters the L level. Thus, the thirteenth, fifteenth, and seventeenth NMOS transistors 72b, 72d, and 72f are turned off. As a result, thereafter, even if the received data is entered to the first to third receiving pins 3a to 3c, the drains of the thirteenth, fifteenth, and seventeenth NMOS transistors 72b, 72d, 72f are kept at the H level and the received data entered to the first to third receiving pins 3a to 3c cannot be written in the receiving shift register 21.

When the received data is entered to at least two of the first to third receiving pins 3a to 3c concurrently, the second simultaneous receiving flag 76b is set "1" and the value is supplied to the CPU as a reception interrupt signal. Upon receiving the interruption signal, the CPU executes a receiving interruption program.

As explained above, according to the above fifth embodiment, because the receiving inhibiting means is provided in the receiving unit, it is inhibited to write the received data entered to any receiving pins in the receiving shift register after the received data is entered to at least two of receiving pins concurrently. Consequently, it is possible for the above semiconductor device to obtain an effect that redundant operations can be avoided, reducing the power consumption significantly.

Furthermore, because the simultaneous receiving flag is provided in the receiving unit, it is possible for the above semiconductor device to obtain an effect that the CPU receives a reception interrupt signal when a predetermined value is set in the simultaneous receiving flag, so that the CPU can execute a receiving interruption program.

Sixth Embodiment

Figure 9:
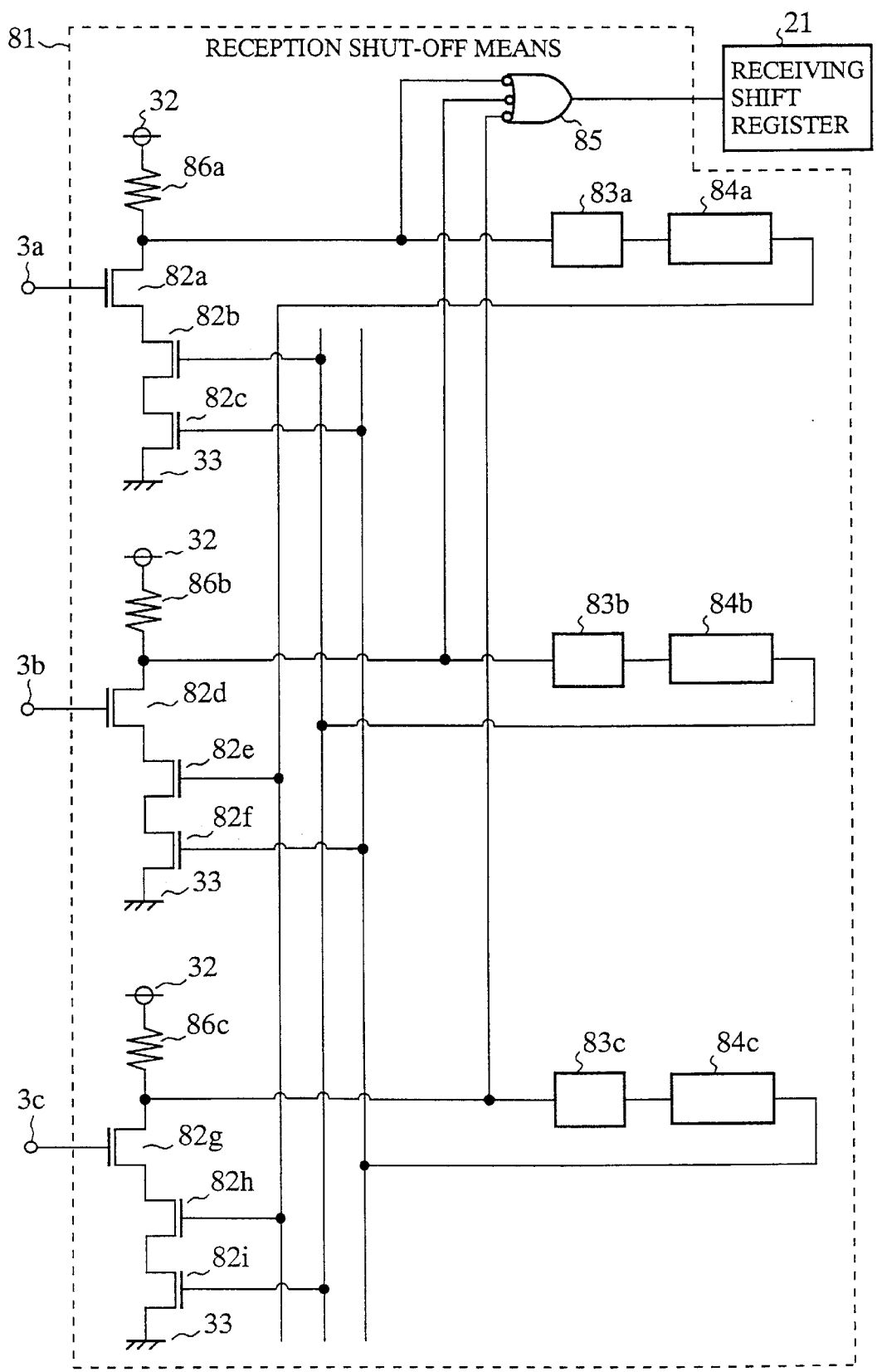
FIG. 9 is a configuration of a reception shut-off means provided in the receiving unit of the serial I/O incorporated semiconductor device in a sixth embodiment of the present invention.

FIG. 9 is a configuration of a reception shut-off means provided in the receiving unit of the serial I/O incorporated semiconductor device in a sixth embodiment of the present invention. In FIG. 9, the semiconductor device is provided with three channels. In FIG. 9, 81 indicates the reception shut-off means for shutting off writing of any of received data entered to the first to third receiving pins 3a to 3c in the receiving shift register 21 after received data input is started at any one of the first to third receiving pins 3a to 3c. The shut-off means 81 is provided between the first to third receiving pins 3a to 3c, and the receiving shift register 21.

In the reception shut-off means 81, 82a indicates an eighteenth NMOS transistor having a gate connected to the first receiving pin 3a. 82b indicates a nineteenth NMOS transistor having a drain connected to the source of the eighteenth NMOS transistor 82a. 82c indicates a twentieth NMOS transistor having a drain connected to the source of the nineteenth NMOS transistor 82b. 83a indicates a ninth start bit detection circuit having an input connected to the drain of the eighteenth NMOS transistor 82a. 86a indicates a tenth resistor having one end connected to the power supply 32 and the other end connected to the drain of the eighteenth NMOS transistor 82a.

82d indicates a twenty-first NMOS transistor having a gate connected to the second receiving pin 3b. 82e indicates a twenty-second NMOS transistor having a drain connected to the source of the twenty-first NMOS transistor 82d. 82f indicates a twenty-third NMOS transistor having a drain connected to the source of the twenty-second NMOS transistor 82e. 83b indicates a tenth start bit detection circuit having an input connected to the drain of the twenty-first NMOS transistor 82d. 86b indicates an eleventh resistor having one end connected to the power supply 32 and the other end connected to the drain of the twenty-first NMOS transistor 82d.

82g indicates a twenty-fourth NMOS transistor having a gate connected to the third receiving pin 3c. 82h indicates a twenty-fifth NMOS transistor having a drain connected to the source of the twenty-fourth NMOS transistor 82g. 82i indicates a twenty-sixth NMOS transistor having a drain connected to the source of the twenty-fifth NMOS transistor 82h. 83c indicates an eleventh start bit detection circuit connected its input connected to the drain of the twenty-fourth NMOS transistor 82g. 86c indicates a twelfth resistor having one end connected to the power supply 32 and the other end connected to the drain of the twenty-fourth NMOS transistor 82g.

84a indicates a fifth flip-flop circuit having an input connected to the output of the ninth start bit detection circuit 83a and an output connected to the gates of the twenty-second and twenty-fifth NMOS transistors 82e and 82h. 84b indicates a sixth flip-flop circuit having an input connected to the output of the tenth start bit detection circuit 83b and an output connected to the gates of the nineteenth and twenty-sixth NMOS transistors 82b and 82i. 84c indicates a seventh flip-flop circuit having an input connected to the output of the eleventh start bit detection circuit 83c and an output connected to the gates of the twentieth and twenty-third NMOS transistors 82c and 82f.

85 indicates an eighth OR circuit having a first input connected to the drain of the eighteenth NMOS transistor 82a so as to receive a reversed value from the drain, a second input connected to the drain of the twenty-first NMOS transistor 82d so as to receive a reversed value from the drain, a third input connected to the drain of the twenty-fourth NMOS transistor 82g so as to receive a reversed value from the drain respectively, and an output connected to the receiving shift register 21.

Other elements are the same as or equal to those given the same numerals in FIG. 1.

Because received data comprises a start bit positioned at a leading end and kept at the L level for a fixed period and data positioned a fixed interval after the start bit, the reception shut-off means 81 recognizes that the ninth to eleventh start bit detection circuits 83a to 83c are set at the H level for a fixed period to detect each start bit.

Next, the operation will be explained.

When received data is entered to the first receiving pin 3a, the start bit entered to the first receiving pin 3a is detected by the ninth start bit detection circuit 83a. Immediately after the detection, the output of the ninth start bit detection circuit 83a enters the L level. Then, the Q output of the fifth flip-flop circuit 84a enters the L level, and thereafter, the Q output of the fifth flip-flop circuit 84a is kept at the L level until the circuit 84a itself is returned to the initial state.

When the received data is entered to the first receiving pin 3a, the Q output of the fifth flip-flop circuit 84a enters the L level. Thus, the twenty-second and twenty-fifth NMOS transistors 82e and 82h are turned off. As a result, thereafter, even if received data is entered to the second and third receiving pins 3b and 3c, the drains of the twenty-first and twenty-four NMOS transistors 82d and 82g are kept at the H level and the received data entered to the second and third receiving pins 3b and 3c cannot be written in the receiving shift register 21. Only the received data entered to the first receiving pin 3a is written in the receiving shift register 21.

As explained above, according to the above sixth embodiment, because the reception shut-off means is provided in the receiving unit, it is shut off writing of the received data entered to any of the receiving pins in the receiving shift register after received data input is started at any one of the receiving pins. Consequently, it is possible for the above semiconductor device to obtain an effect that redundant operations can be avoided, reducing the power consumption significantly.

Seventh Embodiment

Figure 10:
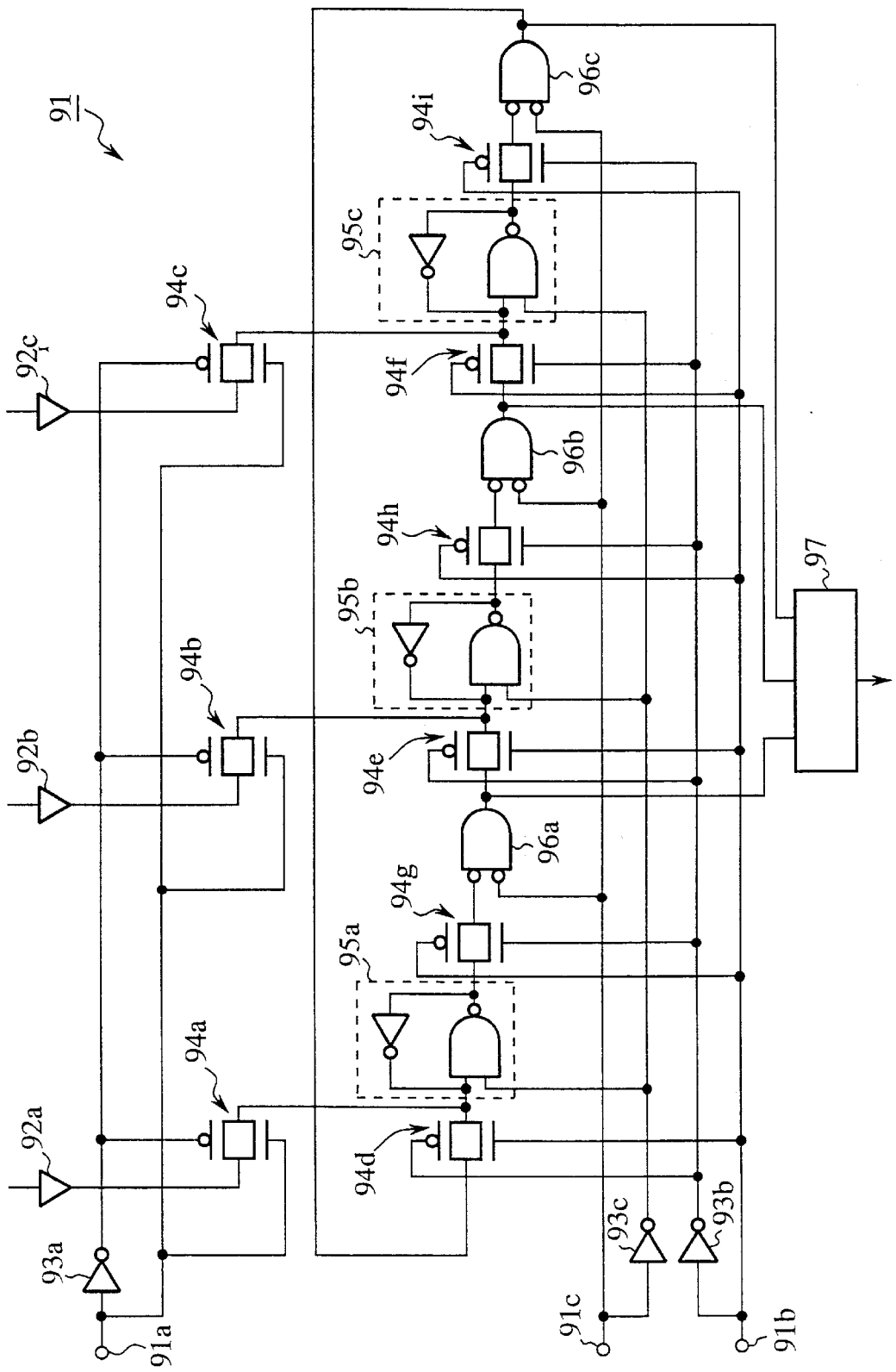
FIG. 10 is a configuration of a receiving channel selection register provided in the transmitting unit of the serial I/O incorporated semiconductor device in a seventh embodiment of the present invention.
Figure 11:
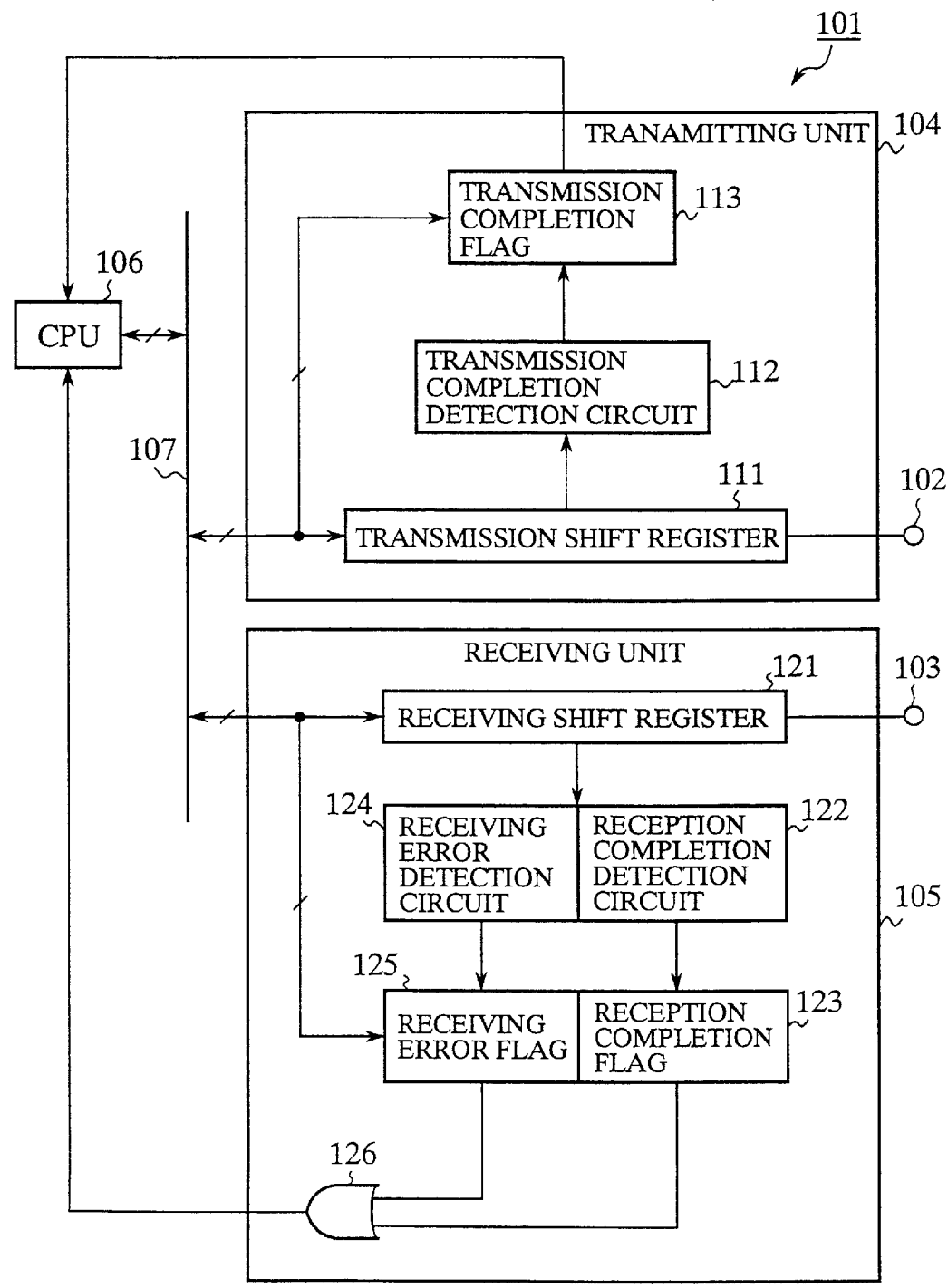
FIG. 11 is a configuration of a conventional serial I/O incorporated semiconductor device.

FIG. 10 is a configuration of a transmission channel selection register provided in the receiving unit of the serial I/O incorporated semiconductor device in a seventh embodiment of the present invention. In FIG. 10, the semiconductor device is provided with three channels. In FIG. 10, 91 indicates the transmission channel selection register for changing over the transmitting pin to output transmit data to other pin each time the transmission completion flag is set to a predetermined value.

In the transmission channel selection register 91, 91a indicates a first pin for receiving a transmission start signal when transmission of data is started, 91b indicates a second pin for receiving a transmission interruption signal, and 91c indicates a third pin for receiving a reset signal when transmission of data is ended. 92a to 92c indicate first to third buffers each having an input connected to a data bus. 93a indicates a first NOT circuit having an input to connected to the first pin 91a, 93b indicates a second NOT circuit having an input connected to the first pin 91a, and 93c indicates a third NOT circuit having an input connected to the third pin 91c.

94a to 94c indicate a first to third transmission gates, each comprising an NMOS transistor having a gate connected to the first pin 91a and a PMOS transistor having a gate connected to the output of the first NOT circuit 93a. 94d to 94f indicate fourth to sixth transmission gates, each comprising an NMOS transistor having a gate connected to the second pin 91b and a PMOS transistor having a gate connected to the output of the second NOT circuit 93b. 94g to 94i indicate seventh to ninth transmission gates, each comprising an NMOS transistor having a gate connected to the output of the second NOT circuit 93b and a PMOS transistor having a gate connected to the second pin 91b.

95a indicates a first latch circuit comprising an AND circuit and a NOT circuit. The AND circuit has one input connected to the first and fourth transmission gates 94a and 94d, has the other input connected to the output of the third NOT circuit 93c, and inputs a revered value of output in the seventh transmission gate 94g. The NOT circuit has an input connected to the output of the AND circuit so as to receive a reversed value from the output thereof and has its output connected to one input of the AND circuit. 95b indicates a second latch circuit comprising an AND circuit and a NOT circuit. The AND circuit has one input connected to the second and fifth transmission gates 94b and 94e, has the other input connected to the output of the third NOT circuit 93c, and inputs a reversed value of output in the eighth transmission gate 94h. The NOT circuit has an input connected to the output of the AND circuit so as to receive a reversed value from the output and has its output to connected one input of the AND circuit. 95c indicates a third latch circuit comprising an AND circuit and a NOT circuit. The AND circuit has one input connected to the third and sixth transmission gates 94c and 94f, has the other input connected to the output of the third NOT circuit 93c, and inputs reversed value of output in the ninth transmission gate 94i. The NOT circuit has an input connected to the output of the AND circuit so as to receive a reversed value from the output and has an output connected to one input of the AND circuit.

96a indicates a twenty-first AND circuit having one input and the other input connected to the output of the first latch circuit 95a so as to receive a reversed value of the output and a reversed value of the reset signal respectively when the seventh transmission gate 94g is turned on, and having an output connected to the fifth transmission gate 94e. 96b indicates a twenty-second AND circuit having one input and the other input connected to the outputs of the second latch circuit 95b so as to receive a reversed value of the output and a reversed value of the reset signal respectively when the eighth transmission gate 94h is turned on, and having an output connected to the sixth transmission gate 94f. 96c indicates a twenty-third AND circuit having one input and the other input connected to the output of the third latch circuit so as to receive a reversed value of the output and a reversed value of the reset signal respectively when the ninth transmission gate 94i is turned on, and having an output connected to the fourth transmission gate 94d. 97 indicates a channel switching means for switching the transmitting pin to output transmit data according to the values output from the twenty-first to twenty-third AND circuits 96a to 96c.

The channel switching means 97 switches among the first, second, and third transmitting pins 2a, 2b, and 2c so that the first transmitting pin 2a is used to output transmit data when the output of the twenty-first AND circuit 96a is at the H level and the outputs of the twenty-second and twenty-third AND circuits 96b and 96c are at the L level, the second transmitting pin 2b is used to output transmit data when the output of the twenty-second AND circuit 96b is at the H level and the outputs of the twenty-first and twenty-third AND circuits 96a and 96c are at the L level, and the third transmitting pin 2c is used to output data when the output of the twenty-third AND circuit 96c is at the H level and the outputs of the twenty-first and twenty-second AND circuits 96a and 96b are at the L level.

Next, the operation will be explained.

When a transmitting pin is selected to output transmit data, at first, an H level transmission start signal is entered to the first pin 91a. At this time, for example, an H level signal is entered via the first buffer 92a and L level signals are entered via the second and third buffers 92b and 92c concurrently.

When the H level transmission start signal is entered to the first pin 91a, the first to third transmission gates 94a to 94c are turned on. While no reset signal is entered, the third pin 91c is at the L level. Thus, when H level signals are entered via the first buffer 92a and L level signals are entered via the second and third buffers 92b and 92c concurrently, the first latch circuit 95a is kept at the H level and the second and third latch circuits 95b and 95c are kept at the L level. While no transmission interruption signal is entered, the second pin 91b is at the L level. Thus, the seventh to ninth transmission gates 94g to 94i are turned on and the fourth to sixth transmission gates are turned off. In addition, both inputs of the twenty-first AND circuit 96a enter the H level and the one input of each of the twenty-second and twenty-third AND circuits 96b and 96c enters the L level and the output of the twenty-first AND circuit 96a enters the H level. The outputs of the twenty-second and twenty-third AND circuits 96b and 96c enter the L level. Thus, the first transmitting pin 2a is used to output transmit data.

Thereafter, as explained above, the H level transmission interruption signal is entered to the second pin 91b when the transmission completion flag is set to the H level.

When the H level transmission interruption signal is entered to the second pin 91b, the fourth to sixth transmission gates 94d to 94f are turned on and the seventh to ninth transmission gates 94g to 94i are turned off, so that the second latch circuit 95b is kept at the H level and the first and third latch circuits 95a and 95c are kept at the L level. And, thereafter, when the second pin 91b is returned to the L level, the fourth to sixth transmission gates 94d to 94f are turned off and the seventh to ninth transmission gates 94g to 94i are turned on, so that both inputs of the twenty-second AND circuit 96b enter the H level and one input of each of the twenty-first first and twenty-third AND circuits 96a and 96c enters the L level. Thus, the output of the twenty-second AND circuit 96a enters the L level and the outputs of the twenty-first and twenty-third AND circuits 96a and 96c enter the L level. As a result, the second transmitting pin 2b is used to output transmit data.

Thereafter, each time the transmission completion flag is set to the H level, the transmitting pin is switched.

As explained above, according to the above seventh embodiment, because the transmission channel selection register is provided in the receiving unit so that the transmitting pin is changed over each time the transmission completion flag is set to a predetermined value, it is possible for the above semiconductor device to obtain an effect that the transmitting pin to output data can be changed over automatically.

What is claimed is:

1. A serial I/O incorporated semiconductor device comprising:

a plurality of transmitting pins for outputting serial transmit data;

a plurality of receiving pins for inputting serial received data;

a CPU;

a transmitting unit comprising a transmission shift register for outputting written transmit data from said transmitting pins, a transmission completion detection circuit for detecting normal completion of transmission of the transmit data, a transmission completion flag set to have a predetermined value by said transmission completion circuit that has detected normal completion of transmission of transmit data and a transmission channel selection register for selecting said transmitting pin to output transmit data, wherein when said transmission completion flag is set to the predetermined value, said transmitting unit supplies the value to said CPU; and a receiving unit comprising a receiving shift register for writing received data inputted to said receiving pins therein, a reception completion detection circuit for detecting normal completion of reception of received data, a reception completion flag set to have a predetermined value by said reception completion detection circuit that has detected normal completion of reception of received data, a receiving error detection circuit for detecting unusual receiving of received data, a receiving error flag set to have a predetermined value by said receiving error detection circuit that has detected unusual receiving of received data, a receiving channel detection circuit for detecting said receiving pins that have received data, a receiving channel flag set to have a predetermined value by said receiving channel detection circuit that has detected said receiving pins that have received data, a plural channels reception detection circuit for detecting that received data is inputted to the plurality of receiving pins by searching a value of said receiving channel flag, and a plural channels receiving flag set to have a predetermined value by said plural channels reception detection circuit which has detected that received data has been inputted to the plurality of receiving pins, wherein when any one of said reception completion flag, said receiving error flag, and said plural channels receiving flag is set to the predetermined value, said receiving unit supplies the value to said CPU as a reception interrupt signal.

2. A serial I/O incorporated semiconductor device according to claim 1, wherein said receiving unit comprises a receiving channel priority specifying means for specifying priority among the plurality of receiving pins and writing received data inputted to the receiving pin having the higher priority in said receiving shift register when the received data is inputted to two or more receiving pins concurrently.

3. A serial I/O incorporated semiconductor device according to claim 1, wherein said receiving unit comprises a receiving channel priority setting means for setting priority among the plurality of receiving pins and writing received data inputted to the receiving pin having the higher priority in said receiving shift register when the received data is inputted to two or more receiving pins concurrently.

4. A serial I/O incorporated semiconductor device according to claim 1, wherein said receiving unit comprises a receiving channel setting means for writing received data inputted to a predetermined receiving pin, the received data being selected from among received data inputted to the plurality of receiving pins, in said receiving shift register.

5. A serial I/O incorporated semiconductor device according to claim 1, wherein said receiving unit comprises a receiving inhibiting means for inhibiting writing of received data inputted to any of the receiving pins in said receiving shift register after the received data is inputted to the plurality of receiving pins concurrently.

6. A serial I/O incorporated semiconductor device according to claim 5, wherein said receiving unit comprises a simultaneous receiving flag set to have a predetermined value when received data is inputted to the plurality of receiving pins concurrently.

7. A serial I/O incorporated semiconductor device according to claim 1, wherein said receiving unit comprises a reception shut-off means for shutting off writing of received data inputted to other receiving pins in said receiving shift register after received data is inputted to any one of the plurality of receiving pins.

8. A serial I/O incorporated semiconductor device according to claim 1, wherein said transmission channel selection register provided in said receiving unit change over the transmitting pin to output transmit data to other transmitting pin each time said transmission completion flag is set to the predetermined value.

* * * * *